United States Patent [19]

Coe

[11] 3,921,494

[45] Nov. 25, 1975

[54] MANHOLE COVER LOCK

[75] Inventor: Donald K. Coe, Albuquerque, N. Mex.

[73] Assignee: Loc-Coe, Albuquerque, N. Mex.

[22] Filed: Aug. 19, 1974

[21] Appl. No.: 498,334

[52] U.S. Cl. ............. 85/3 R; 85/45; 292/192; 292/DIG. 11; 404/25
[51] Int. Cl.² ............. F16B 21/00; F16B 23/00
[58] Field of Search ............. 85/3 R, 3 K, 3 S, 45; 24/211 P, 212; 292/192, DIG. 11, 256, 256.67, 258, 212; 404/25

[56] References Cited
UNITED STATES PATENTS

| | | | |
|---|---|---|---|
| 1,296,275 | 3/1919 | Firth | 85/1 H X |
| 2,693,691 | 11/1954 | Pasanen | 85/9 R X |
| 2,916,235 | 12/1959 | Nagel | 85/3 R X |

FOREIGN PATENTS OR APPLICATIONS

| | | | |
|---|---|---|---|
| 1,142,858 | 2/1969 | United Kingdom | 85/79 |
| 589,054 | 6/1947 | United Kingdom | 85/3 R |

*Primary Examiner*—Ramon S. Britts
*Attorney, Agent, or Firm*—Townsend and Townsend

[57] ABSTRACT

A manhole cover lock is provided employing two units diametrically situated and extending through openings in the manhole cover. The units engage a projection of the manhole cover housing to prevent the removal of the manhole cover when the units are in position. The units comprise a cylindrical body having a yoke at one end, a locking plate pivotally mounted in the yoke, with the face opposite the yoke, flanged, and having a central recess. Extending through the body is an eccentric bore, in which a rod is housed, cooperating with said locking plate to provide a dog lock. A bolt member having a keyed head is threaded into a threaded axial bore in said body to prevent axial movement of said rod.

6 Claims, 8 Drawing Figures

U.S. Patent  Nov. 25, 1975  3,921,494
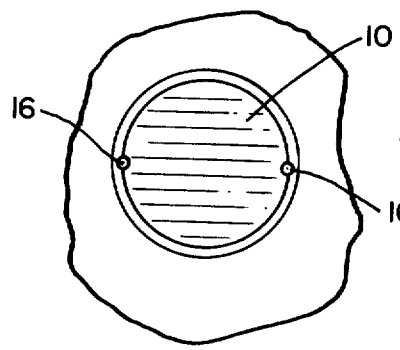
FIG_8
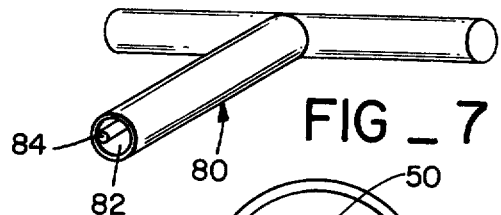
FIG_7
FIG_2
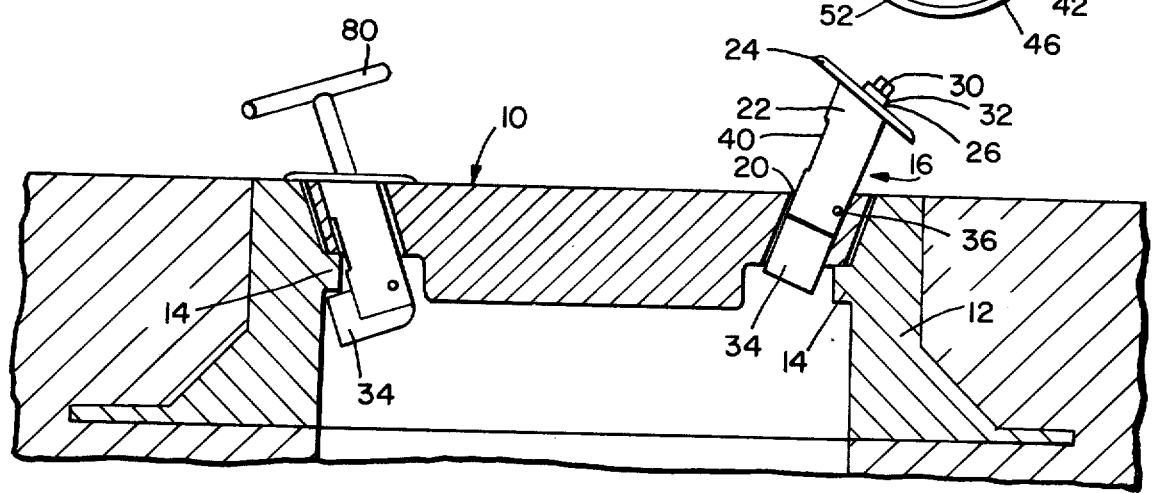
FIG_1
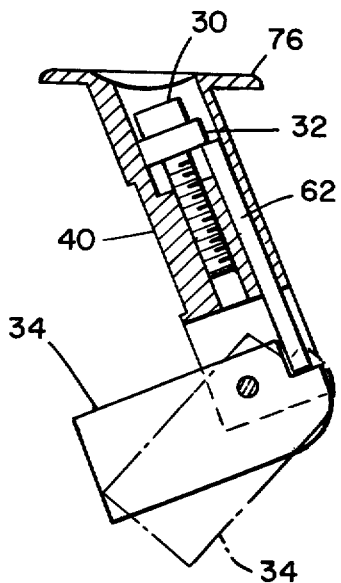
FIG_3
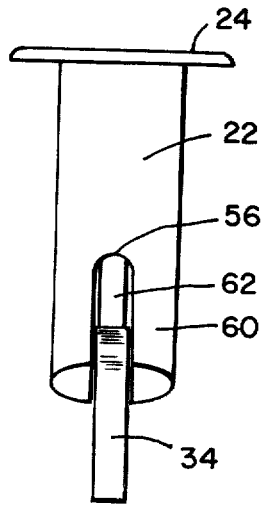
FIG_5
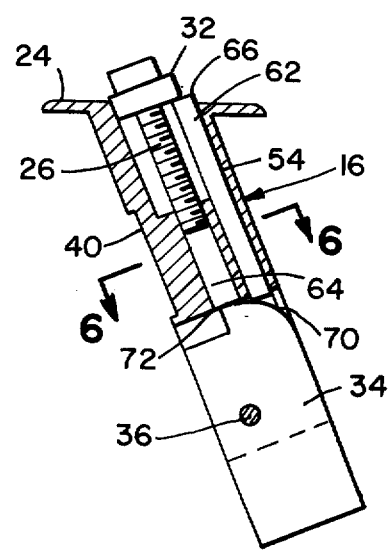
FIG_4
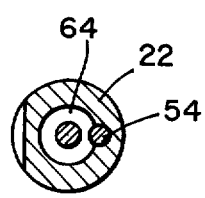
FIG_6

MANHOLE COVER LOCK

BACKGROUND OF THE INVENTION

Despite the heavy weight of manhole covers, manhole covers remain a likely object for theft. Furthermore, it is undesirable that other than authorized people have access to the area under the manhole. By locking manholes, unauthorized people can be prevented from entering the manhole and interferring with the proper operation of the equipment or use of the equipment in an unauthorized manner.

SUMMARY OF THE INVENTION

A strong, simple, economic manhole cover lock is provided having a cylindrical body with a yoke at one end in which is pivotally mounted a locking plate. The other end of the body has a flanged face at an oblique angle to the axis of said body with a central recess. A first bore eccentrically situated, extends through said housing, from the recess to the top of the yoke. A rod in the first bore cooperates with the locking plate to provide a dog lock. Axial movement of the rod is prevented by a threaded bolt having a keyed head, with the keyed head threaded, overlapping the first bore, when the bolt is engaged in a threaded bore, situated adjacent to the first bore.

BRIEF DESCRIPTION OF THE SEVERAL VIEWS OF THE DRAWINGS

FIG. 1 is a vertical section of a manhole cover and housing having one locking unit in locking position, and a second locking unit, partially introduced into an opening in the manhole;

FIG. 2 is a top plan view of the locking unit;

FIGS. 3 and 4 are partial vertical sections of the locking unit in locked and unlocked positions respectively;

FIG. 5 is a side view of the locking unit;

FIG. 6 is a cross section view along line 66 of FIG. 4;

FIG. 7 is a perspective view of a locking wrench employed with the locking unit; and FIG. 8 is a plan view of a manhole cover with the locking units in place.

DESCRIPTION OF THE SPECIFIC EMBODIMENTS

An apparatus is provided for locking manhole covers to prevent unauthorized intrusion into the manhole area. A minimum of two locking units is required, although more than two may be used. Each locking unit or assembly has a cylindrical housing or body, having a partially recessed angled face at one end and a yoke or U-shaped member at the other end.

Extending from the angled face in planar relationship is a flange, which serves as a strike plate, the flange lying flat on the manhole cover surface when the locking unit is in position. The throat of the yoke defines a central plane through the housing axis intersecting the highest and lowest points of the flange.

Pivotally mounted in the yoke member is a locking plate, which is notched at one corner and engages the bottom of the throat of the yoke, so as to be in axial alignment with the body or housing, when the locking unit is introduced through the opening of the manhole cover. Conveniently, the locking paw is mounted on a cross rod in the yoke at other than its center of gravity.

The body or housing has two aligned or parallel bores substantially parallel to the axis of the housing. The first bore serves as a guide and slidably contains a control push pin or rod which cooperatively co-acts with the locking plate to form a locking dog, pressing into the notch in the plate, so as to position the locking plate laterally from the housing. The second bore, which is optionally and conveniently axially located in the housing, is threaded to receive a threaded bolt having a keyed or notched head and having a thrust bearing, which overlaps at least a portion of the first bore, so as to lock the pin or rod in position preventing axial movement. An index or notch is provided in the housing on the side adjacent the upper end of the angled face.

A wrench is provided having an inset, which conforms to the keyed head, for threading the bolt into the threaded bore and locking the pin or rod in locked position.

The manhole cover has openings which angle inwardly. When introducing the locking assembly into the manhole cover, the assembly is introduced with the notch toward the center of the manhole cover. The locking plate is then naturally positioned in axial alignment with the housing. When the locking plate has passed beyond the bottom of the manhole cover, the housing is twisted around so that the index is directed toward the periphery of the manhole cover and the flange or strike plate will lie flush with the manhole cover surface. The keyed head bolt may now be tightened into the threaded bore, so that the thrust bearing presses down on the push pin, which engages the locking plate notch, pivoting the locking plate at an angle substantially parallel to the strike plate and engaging the rim of the manhole cover housing or ring. By locking two diametrically positioned units, the manhole cover is effectively locked into position and can only be removed by someone having an appropriate wrench, so as to loosen or remove the bolt to release the push pin.

For further understanding of the invention, the drawings will now be considered.

In FIG. 1, a manhole cover 10 is situated in manhole ring 12, which has an annular projection 14. A manhole lock 16 is depicted in the process of being introduced through an opening 20 in the manhole cover 10.

The manhole cover lock 16 has a cylindrical body 22, strike plate 24, and threaded bolt 26 with keyed head 30. Slidably mounted on threaded bolt 26 is thrust bearing 32. Locking plate 34 is pivotally mounted on pin 36, and as the locking unit is introduced into the manhole cover opening, is in axial alignment with cylindrical body 22. A notch or index 40 is directed toward the center of the manhole cover 10.

For further details concerning the locking unit, FIGS. 2 to 6 will be considered.

In FIG. 2, the circular strike plate has a curved edge 42. The upper face 44 of the body 22 has a recess 46 with bore opening 50. With threaded bolt 26 in position, the thrust bearing 32, overlaps a portion of bore opening 50.

In FIG. 4, the locking unit 16 is shown in the unlocked position. Extending through the body 22 is axially displaced bore 54, which extends from the recess 46 to the top 56 of yoke 60. A push pin 62 is slidably housed in said axially displaced bore 54. A substantially axial threaded bore 64 receives in threaded engagement, bolt 26, on which thrust bearing 32 is slidably mounted. The bottom surface of thrust bearing 32, rests on the top 66 of push pin 62, when the manhole cover lock 16 is in the unlocked position.

Locking plate 34 is pivotally mounted on pin 36 with a curved contoured end portion 70 engaging push pin 62 in the unlocked position. The tip 72 of the curved end portion 70 encounters the top of the yoke 56 preventing free rotation of the plate 34.

In FIG. 3, the manhole lock is depicted in the locked position, with the broken line indicating the positions of the push pin 62, thrust bearing 32, and threaded bolt 26 in the unlocked position, with the notch 40 directed toward the periphery of the manhole cover 10.

As the lock is turned in position, once the locking plate 34 has cleared the manhole cover, the weight of the plate 34 will position the plate at an angle to the axis of the body 22, so that the plate hangs under the projection 14. The threaded bolt 26 is tightened so that thrust bearing 32 engages push pin 62, forcing push pin 62 against notch face 74. Plate 34 moves laterally from body 22, so as to engage projection 40 in the locked position. The major portion or entire bolt head 30 is below the top surface 76 of strike plate 24 in the locked position. The manhole lock 16 is depicted in FIG. 1 in the locked position with tee wrench 80 engaging the keyed head 30.

A tee wrench is employed having a recess 82 with post 84, which conforms with notch 52 in the keyed head 30. The wrench is used to tighten the threaded bolt 26 and lock the manhole lock in position.

At least two manhole locks are required, as depicted in FIG. 8, and are conveniently diametrically positioned. Once the threaded bolt 26 is tightened, the manhole lock 16 locks the manhole 10 in position, so that only a wrench having the prescribed configuration can be used to release the manhole.

It is found that the flange or strike plate 24 should be set at about 20° from the normal to the axis of the body. At this angle, the locking plate 34 readily assumes an appropriate angle, when the lock is introduced into the manhole cover opening, and turned with the notch directed to the outer portion of the manhole. By tightening the threaded bolt and pushing the push pin against the locking plate, the locking plate moves upward against the projection of the manhole ring, locking the entire assembly.

The subject invention provides a convenient and simple means for locking manholes, so as to prevent their removal or unauthorized intrusion into the manhole. A special wrench is required in order to release the manhole cover, once the manhole locks are in position.

Although the foregoing invention has been described in some detail by way of illustration and example for purposes of clarity of understanding, it will be obvious that certain changes and modifications may be practiced within the scope of the appended claims.

What is claimed is:

1. A manhole cover lock comprising:

a cylindrical housing having an angled upper face at one end with a co-planar flange extending therefrom, and a yoke at the other end;
a first axially displaced longitudinal bore extending through said housing;
a second threaded longitudinal bore adjacent and parallel said first bore;
a control rod slidably housed in said first bore;
a locking plate having a first end shaped for engagement of said control rod, pivotally mounted in said yoke, and having a longitudinal portion, extending substantially laterally of said housing in the direction of the upper end of said angled face, when said control rod is engaged therewith; the length of said control rod being at least as great as the distance from the upper end of said first bore to said first end of the locking plate when said longitudinal portion of the locking plate is in the laterally extended position;
threaded locking means threaded in said second bore having a keyed head member extending over said first bore for causing said control rod to be axially disposed to engage and position said locking plate laterally from said housing in a locked condition and to prevent axial movement of said control rod when said manhole lock is in the locked position, key means requiring a special tool on the head of the threaded locking means defining the sole means for the rotation thereof; and
a recess in said upper face sized to allow said head member to be disposed substantially, below said upper face so that said threaded locking means is contained within said housing when said manhole cover is in the locked condition.

2. A manhole cover lock according to claim 1, including:
an index means on the side of said housing adjacent the upper end of said upper face.

3. A manhole cover lock according to claim 2, wherein said first end has a notch and a contoured circular segment which engages said housing, so that said locking plate is in axial alignment with said housing when said manhole cover lock is in the unlocked position.

4. A manhole cover lock according to claim 1, wherein said first end has a notch and a contoured circular segment which engages said housing, so that said locking plate is in axial alignment with said housing when said manhole cover lock is in the unlocked position.

5. A manhole cover lock according to claim 1, wherein said threaded locking means is a threaded bolt and said keyed head member comprises a keyed bolt head and thrust bearing slidably mounted on said bolt.

6. A manhole cover lock according to claim 1, wherein said flange is an annular plate.

* * * * *